US 7,011,803 B2

(12) United States Patent
Ichikawa et al.

(10) Patent No.: US 7,011,803 B2
(45) Date of Patent: Mar. 14, 2006

(54) HONEYCOMB STRUCTURE AND METHOD FOR ITS MANUFACTURE

(75) Inventors: Shuichi Ichikawa, Handa (JP); Takahiro Tomita, Ogaki (JP); Shinji Kawasaki, Nagoya (JP); Hiroaki Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 265 days.

(21) Appl. No.: 10/257,008

(22) PCT Filed: Apr. 12, 2001

(86) PCT No.: PCT/JP01/03140

§ 371 (c)(1),
(2), (4) Date: Oct. 7, 2002

(87) PCT Pub. No.: WO01/79138

PCT Pub. Date: Oct. 25, 2001

(65) Prior Publication Data
US 2003/0134084 A1 Jul. 17, 2003

(30) Foreign Application Priority Data
Apr. 14, 2000 (JP) .......................... 2000-113513
Nov. 6, 2000 (JP) .......................... 2000-337936
Feb. 8, 2001 (JP) .......................... 2001-032699

(51) Int. Cl.
C01B 31/36 (2006.01)
B28B 1/00 (2006.01)
B28B 3/00 (2006.01)
B28B 5/00 (2006.01)

(52) U.S. Cl. ..................... 423/345; 264/630
(58) Field of Classification Search ............... 423/345, 423/421, 430, 439, 441; 264/630, 631
See application file for complete search history.

(56) References Cited

U.S. PATENT DOCUMENTS

| 4,329,162 | A  | * | 5/1982  | Pitcher, Jr. ............... 55/523 |
| 4,510,265 | A  | * | 4/1985  | Hartwig .................. 502/330 |
| 4,777,152 | A  | * | 10/1988 | Tsukada .................. 501/80 |
| 5,080,378 | A  | * | 1/1992  | Kagawa ................... 277/404 |
| 6,217,841 | B1 | * | 4/2001  | Grindatto et al. .......... 423/345 |
| 6,746,748 | B1 | * | 6/2004  | Ichikawa et al. .......... 428/116 |
| 6,777,114 | B1 | * | 8/2004  | Kawasaki et al. .......... 428/698 |

FOREIGN PATENT DOCUMENTS

| JP | 52-154816 A  | 12/1977 |
| JP | A 60-255671  | 12/1985 |
| JP | A 61-26550   | 2/1986  |
| JP | B2 61-13845  | 4/1986  |
| JP | B2 61-13846  | 4/1986  |
| JP | A 1-172290   | 7/1989  |
| JP | A 1-192764   | 8/1989  |

(Continued)

OTHER PUBLICATIONS

Translation of JP 05-1722 7.*

(Continued)

Primary Examiner—Colleen P. Cooke
(74) Attorney, Agent, or Firm—Oliff & Berridge, PLC

(57) ABSTRACT

A honeycomb structure having a large number of channels through along the axial direction and being defined by partition walls. A honeycomb structure containing a refractory particle to be an aggregate and metallic silicon and being porous. This honeycomb structure can be suitably used under high SV conditions as a filter for purifying automobile exhaust gas by treatment such as clogging or catalyst supporting.

24 Claims, 2 Drawing Sheets

FOREIGN PATENT DOCUMENTS

| | | |
|---|---|---|
| JP | A 3-126670 | 5/1991 |
| JP | 05-17227 * | 1/1993 |
| JP | 5-17227 A | 1/1993 |
| JP | A 6-182228 | 7/1994 |
| JP | A 8-165171 | 6/1996 |
| JP | A 9-85038 | 3/1997 |
| JP | A 10-310474 | 11/1998 |

OTHER PUBLICATIONS

U.S. Appl. No. 10/296,148 filed Nov. 21, 2002.

* cited by examiner

HONEYCOMB STRUCTURE AND METHOD FOR ITS MANUFACTURE

TECHNICAL FIELD

The present invention relates to a honeycomb structure used for filters and catalyst carriers or the like for purifying exhaust gases of automobiles.

BACKGROUND ART

Porous honeycomb structures have been widely used as filters for collecting and removing granular material contained in dust-bearing fluids like diesel engine exhaust gas or as catalyst supporters for supporting catalyst components for purifying exhaust gases. Also, it is well known that refractory particles such as a silicon carbide (SiC) particle are used as composition material for such a honeycomb structure.

As a specifically relating art, for example, JP-A-6-182228 discloses a porous silicon carbide catalyst carrier of a honeycomb structure obtained by a preparation method that involves forming in a desired shape a silicon carbide powder having a given specific surface area as well as containing impurities, used as the starting material, drying and subsequently firing in a temperature range of 1600 to 2200° C.

On the other hand, JP-A-61-26550 discloses a method of manufacturing a refractory bearing vitrifying material that features adding vitrifying material to a readily oxidized material or a refractory composition containing a readily oxidized material, mixing the resultant material with a binding agent, kneading and molding, and subsequently bare burning a molded body thus molded in a furnace under a non-oxidizing atmosphere. JP-A-8-165171 discloses a silicon carbide molded article molded subsequently to the addition of an organic binder and an inorganic binder of a clay mineral base, glass base, or lithium silicate base to a silicon carbide powder.

In addition, JP-A-6-182228 above presents as a conventional method for manufacturing a porous silicon carbide sintered compact a manufacturing method that includes adding a binding material such as vitrified flux or clay to carbonate particles to be an aggregate, molding, and subsequently sintering and hardening the resulting molded body at the temperature at which the aforementioned binding material.

Furthermore, JP-B-61-13845 and JP-B-61-13846 disclose a refractory particle graded to a specified particle size, comprising silica sand, ceramic pulverized substances, metal oxides such as $Al_2O_3$, $TiO_2$, $ZrO_2$, silicon carbide, nitrides, borides, or other refractory materials, and a suitable average particle size of a refractory particle, a particle size distribution of a refractory particle, the porosity of a tubular body, the average pore diameter of a tubular body, the pore volume of a tubular body, and the partition wall thickness of a tubular body, and the like, with respect to a high temperature ceramic filter formed in a porous, bottomed tubular shape with a refractory bonding material such as liquid glass, flit, glaze, and the like.

Additionally, JP-B-8-13706 discloses a silicon carbide/metallic silicon composite having a structure integratedly joined via metallic silicon and a process for manufacturing the aforementioned composite using silicon carbide and metallic silicon formed by heat treating silicon accumulated biomass under a argon or nitrogen atmosphere.

With a burned form (necking) by means of the recrystallization of silicon carbide powder itself, disclosed in JP-A-6-182228 as described above, the silicon carbide component is evaporated from the surfaces of the silicon carbide particles, and the evaporated component is condensed in the contact portions (neck portions) between particles, and thus the neck portions grow to yield the bonded state. However, evaporation of the silicon carbide requires a very high firing temperature, which leads to a high cost. Also, a material of a high thermal expansion coefficient needs to be fired at a high temperature. These create the problem of decreasing the firing process yield.

In addition, production of a filter of a high porosity, particularly with a porosity of 50% or more, by firing via recrystallization of the aforementioned silicon carbide itself, leads to inhibition of the growth of the neck portion due to insufficient performance of the sintering mechanism, thereby creating the problem of decreasing the strength of the filter.

Furthermore, the aforementioned material, with a very high thermal conductivity of 30 W/mK or more, has an advantage in suppressing a local heat evolution. However, for example, when a filter is used that has a system of oxidizing and combusting a particulate with a catalyst carried to continuously perform reproduction, it requires much time to raise the temperature of the carrier because of a small amount of particulate accumulated and an easy emission of heat. Therefore, it needs time to increase the temperature to a temperature at which the catalyst functions, which also creates the problem of producing cinders of the particulate resulting in a decrease in reproduction efficiency.

An approach to bonding a raw material of a silicon carbide via glass material, disclosed in JP-A-61-26550 and JP-A-6-182228, can handle the matter using a low firing temperature of 1,000 to 1,400° C. However, for example, use of a sintered body prepared by this method as a material for a diesel particulate filter (DPF) for removing a particulate contained in exhaust gases discharged from a diesel engine, causes the problem of locally generated heat due to a small thermal conductivity when combusting particulates collected and accumulated on the filter.

Moreover, while the filters disclosed in JP-B-61-13845 and JP-B-61-13846 are porous, they are a bottomed cylinder with a thick partition wall of 5 to 20 mm and thus cannot apply to conditions of a high space velocity (SV) like in a filter for purifying automobile exhaust gas.

In addition, according to a composite and the manufacturing method thereof indicated in JP-B-8-13706, the composite can be made to be porous; however, it is not easy to ensure a sufficient porosity when the composite is utilized as a filter, and particularly it is difficult to use the composite as a filter for collecting and removing granular materials contained in a dust-bearing fluid like diesel engine exhaust gas.

The present invention has been made taking into consideration these conventional circumstances, and the object of the invention is to provide a honeycomb structure which can be costlessly produced at a relatively low firingburning temperature while containing refractory particles such as a silicon carbide particle and which is sufficiently porous, have a high specific surface area and can be suitably used as a filter for purifying automobile exhaust gas under high SV conditions by means of treatment of clogging, catalyst supporting, etc. and the manufacturing method thereof.

DISCLOSURE OF THE INVENTION

According to the present invention, there is provided a honeycomb structure having a large number of channels through along the axial direction and defined by partition walls, characterized in that the structure includes refractory particles and metallic silicon that form an aggregate and is porous.

According to the present invention, there is also provided a method for manufacturing a honeycomb structure, characterized in that the method involves adding metallic silicon and an organic binder to a raw material of refractory particles, admixing and kneading it, forming the resulting body for ceramics into a honeycomb shape, calcining the obtained molded body to remove the organic binder in the molded body, and subsequently firing.

BEST MODE FOR CARRYING OUT THE INVENTION

As discussed above, a honeycomb structure of the present invention contains refractory particles as well as metallic silicon for bonding the refractory particles, and therefore can be fired at a relatively low firing temperature during its production. Accordingly, the production cost can be cut and the yield can be improved. In addition, utilization of metallic silicon for bonding refractory particles leads to its high thermal conductivity as compared with a conventional structure using vitreous material for refractory particle bonding. Hence, for example, when the structure is employed in a DPF, it does not produce local heat generation resulting in damage of the filter even though the deposited particulates are burned for filter reuse. Furthermore, the present invention is not a bottomed cylinder of a thick wall that is disclosed in JP-B-61-13845 and JP-B-61-13846, but is a porous honeycomb structure, and thus can be used under high SV conditions as a filter for purifying automobile exhaust gas, a catalyst support, or the like.

Figure 2:
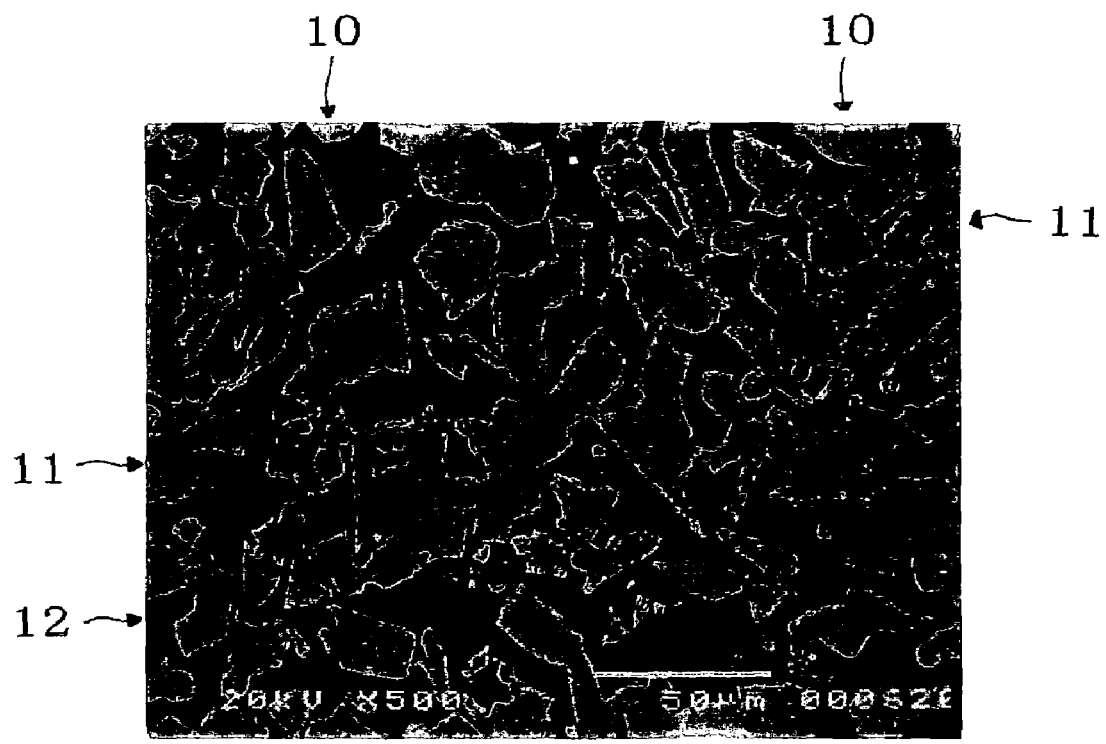
FIG. 2 is a microscopic photo of a crystal structure of a silicon carbide sintered body prepared in Example 1.

Additionally, in a honeycomb structure of the present invention, refractory particles constituting the honeycomb structure preferably have a structure wherein the particles are bonded together by means of metallic silicon in part of the particle surface thereof. FIG. 2 is a microscopic photo that shows a honeycomb structure concerning the present invention and a crystalline structure of a silicon carbide sintered body. In the figure, the white part indicates metallic silicon 10, the gray part a silicon carbide particle 11, the black part a pore 12. As is shown, the silicon carbide particles 11 of a refractory particle are bonded to each other in part of the particle surface by the metallic silicon 10. In addition, the method for manufacturing a silicon carbide sintered body as illustrated in FIG. 2 will be discussed later.

The above structure is formed without using metallic silicon more than necessary, and thus the densification due to merging of metallic silicon itself caused in the burning process can be restrained. Accordingly, sufficient porosity is ensured to keep the pressure loss low when the structure is used as a filter. Furthermore, the structure has a high thermal conductivity as well, and so, for example, when it is employed as a DPF or the like to collect and remove particulates contained in exhaust gas discharged from a diesel engine, a high porosity is sufficiently guaranteed and also a local evolution of heat leading to the damage of the filter is not effected because of having a high thermal conductivity even if a deposited particulate is combusted for filter reuse.

A honeycomb structure of the present invention preferably has a thermal conductivity of 5 W/mK or more, in terms of avoiding a local generation of heat as discussed above.

In addition, a honeycomb structure of the present invention preferably has a structure wherein refractory particles are bonded together via metallic silicon with the shape of the raw material particle maintained in its microstructure. When a honeycomb structure of the present invention is used as a filter for collecting and removing granular material contained in a dust-bearing fluid, the porosity is preferably within the range of 30 to 90%. When the porosity of the honeycomb structure is below 30%, the speed of filtration is not sufficient; the strength as a structure is low when the porosity exceeds 90%. Furthermore, when the structure is used in an application in which a pressure loss in a filter for purifying automobile exhaust gas, etc. may be effected, the porosity is preferably made to be 40% or more.

Moreover, when the honeycomb structure is utilized as a filter that is used with the pressure loss maintained low, including a filter system that continuously combusting particulates by use of a catalyst as supporter, preferably the porosity is from 50 to 90% and the thermal conductivity from 5 to 30 W/mK, more preferably the porosity is from 50 to 80% and the thermal conductivity from 7 to 28 W/mK, and particularly preferably the porosity is from 53 to 70% and the thermal conductivity from 9 to 25 W/mK.

In a honeycomb structure used as a filter system wherein a catalyst is supported, a porosity needs to be set high in advance inasmuch as carrying a catalyst increases the pressure loss. Therefore, a porosity of less than 50% is not preferable in that the filter system renders the pressure loss large. On the other hand, a porosity exceeding 90% is not preferable due to lack of strength as a structure.

Further, in a honeycomb structure used in a filter of the aforementioned system, a local stress in a filter generated by a nonuniform temperature distribution caused by a local heat generation needs to be restrained to occur. Thus, a thermal conductivity of below 5 W/mK is difficult to effectively suppress the local heat generation. On the other hand, when the thermal conductivity exceeds 30 W/mK, the effect of heat radiation becomes large and the amount of particulates accumulated is small. As a consequence, it requires much time to raise the temperature to a temperature at which the catalyst functions due to resistance to temperature rising, and also cinders of the particulate are generated, which lowers the efficiency of filter reproduction. Hence, the case is not preferable.

In addition, catalysts supported in a filter concerning the present invention refer to catalysts used to combust a particulate and decompose NOx, and more particularly include noble metals such as platinum, palladium, rhodium, iridium and silver and oxides such as alumina, zirconia, titania, ceria and iron oxides, but the present invention is by no means limited to these species.

Similarly, when a honeycomb structure of the present invention is used as a filter, the average pore diameter of the honeycomb structure is preferably determined on the basis of the target of filtration. For example, if the structure is used as a DPF for collecting and removing particulates contained in exhaust gas discharged from a diesel engine, the average pore diameter is preferably made to be within the range of 2 to 50. When the average pore diameter is below 2 $\mu$m, the pressure loss is remarkably raised even via a small amount of particulate accumulated; conversely, when the diameter is over 50 μm, a particulate passes through without being affected. Thus, the case is not preferable.

A suitable content of metallic silicon in a honeycomb structure of the present invention is preferably within the range of 5 to 50% by weight with respect to the total amount of the refractory particle and the metallic silicon, although it varies with the particle size and particle shape of the refractory particle, and more preferably within the range of 15 to 40% by weight. When the content is less than 5% by weight, neighboring refractory particles insufficiently bond to each other via metallic silicon due to lack of binding material, not only leading to a decrease in the thermal conductivity, but making it difficult to obtain the strength of allowing a thin-walled structure like a honeycomb structure to be maintained. Conversely, if the content exceeds 50% by weight, metallic silicon is present in an amount more than the extent of suitably causing refractory particles to bond to each other, which in turn effects excessive contraction of the honeycomb structure (sintered body) by burning, leading to detrimental effects such as a porosity decrease and average pore size contraction. Thus, the case is not preferable.

The thickness of a partition wall defining the channel pore (cell) of a honeycomb structure is preferably made to be 4 mil or more (102 μm or more). If the thickness of a partition wall is less than 4 mil (102 μm), the strength as a structure is insufficient. In addition, the strength and the porosity are closely related, and for a honeycomb structure of the present invention, when the thickness of a partition wall is set in a manner such that the thickness of the partition wall and the porosity satisfies the relation below, it is shown that a necessary strength is preferably obtained:

Thickness of partition wall $(\mu m) \geqq$ porosity $(\%) \times 4$.

Furthermore, the thickness of a partition wall is more preferably set so that the thickness of the partition wall and the porosity satisfies the following relation, to obtain a sufficient strength:

Thickness of partition wall $(\mu m) \geqq$ porosity $(\%) \times 5$.

On the other hand, when the structure is used as filters such as DPF, the thickness of the partition wall is preferably 50 mil or less (1270 μm or less). When the thickness of the partition wall exceeds 50 mil (1270 μm), concerns rise about lack of a filter speed and a rise in pressure loss. In addition, these are also closely related to the porosity, and problems can be avoided by setting the thickness of the partition wall in such a way that the thickness of the partition wall and the porosity satisfy the following relation:

Thickness of partition wall $(\mu m) \leqq$ porosity $(\%) \times 20$.

The cell density of a honeycomb structure is preferably in the range of 5 to 1000 cells/square inch (0.7 to 155 cells/cm$^2$). When the cell density is less than 5 cells/square inch (0.7 cell/cm$^2$), the honeycomb structure is low in strength; when the structure is used as a filter, the filtration area is also in lack. Conversely, if the density exceeds 1000 cells/square inch (155 cell/cm$^2$), a rise in pressure loss does not preferably result.

Now, the method for manufacturing a honeycomb structure of the present invention will be described. When producing a honeycomb structure of the present invention, first, metallic silicon and an organic binder are added to the raw material of a refractory particle, and then the resulting material is admixed and kneaded to obtain a body for ceramics for molding.

The kind of refractory particles to be used are not particularly limited, but suitable examples for use include oxides such as $Al_2O_3$, $ZrO_2$ and $Y_2O_3$, carbides such as SiC, nitrides such as $Si_3N_4$ and AlN, and others including mullite. For example, with applications such as DPFs that is often exposed to elevated temperatures when an accumulated particulate is treated by combustion, SiC or the like, having a high heat resistance, is suitably used. In addition, although raw materials used for refractory particles and metallic silicon sometimes contain trace quantities of impurities such as Fe, Al and Ca, they can be directly used or may be utilized after purification by chemical treatment such as purifying by chemicals.

The average particle diameter of raw materials of refractory particles is preferably 2 to 4 times the average pore diameter of a honeycomb structure (burned body) finally obtained by the present manufacturing method. A honeycomb structure obtained by the present manufacturing method exhibits a comparatively low firing temperature, and thus the particle shape and the particle diameter are maintained roughly until the end of firing. Therefore, if the aforementioned ratio is a factor of less than 2, the particle diameter is too small relative to the pore diameter; as a result, groups of small refractory particles are bonded in a long and narrow shape by means of metallic silicon to form a large pore, and thus a strength cannot be provided high enough to keep a thin-walled structure like a honeycomb structure.

Also, for example, if a refractory particle is a SiC particle, recrystallized SiC that has been applied to a conventional porous honeycomb structure requires a particle diameter of the raw material of an aggregate almost equivalent to a desired pore diameter, while with SiC particles bonded together via metallic silicon like a honeycomb structure of the present invention, the particle diameter may be 2 times the pore diameter, and so, when the same pore diameter is to be obtained, a rough material relative to recrystallized SiC, i.e., an inexpensive material, can be utilized, leading to a large cost merit as well.

Inversely, if the aforementioned ratio exceeds 4 times, the particle diameter of a refractory particle used for a desired pore diameter is too large, and a desired pore in its space is difficult to obtain even though the refractory particles are closely packed in the stage of molding, and further a decrease in porosity in a filter application results. Thus, the case is not preferable.

Metallic silicon melts during burning to moisten the surface of refractory particles and serve to bond the particles to each other. A suitable amount of the particle to be added, although depending on the particle diameter and the particle shape of refractory particles, is preferably within the range of 5 to 50% by weight based on the total amount of the refractory particle and the metallic silicon. When the content is less than 5% by weight, it causes a shortage and makes it difficult to obtain the strength of allowing a thin-walled structure like a honeycomb structure to be maintained. Inversely, if the content exceeds 50% by weight, metallic silicon is present in an amount more than the extent of suitably causing refractory particles to bond to each other, and thus it leads to detrimental effects such as a porosity decrease and average pore size contraction.

The average diameter of metallic silicon is preferably 50% or less of the average diameter of a refractory particle, or an aggregate. Metallic silicon melts by firing and collects, and moves while sticking to the refractory particles, and so, when the particle diameter exceeds 50% of the particle diameter of a refractory particle, space occupied by the metallic silicon particles becomes a large void during molding and remains, which leads to a decrease in strength, or causes decline in filter efficiency (filter leakage) when the structure is utilized as a filter.

In addition, generally, during extrusion of a honeycomb structure, mixing of 2 species or more of raw material powders having different particle sizes rather leads to smooth extrusion. Accordingly, also in order to obtain an appropriate structure as a porous body, the average particle diameter of metallic silicon is preferably made to be 50% or less of the average particle diameter of a refractory particle, or an aggregate.

In order to smoothly extrude in a honeycomb shape a body for ceramics formulated with metallic silicon and, as necessary, a pore forming agent, etc. using a refractory particle as aggregate, at least one species of organic binders is preferably added as a molding adjuvant in an amount of 2% by weight or more as a superaddition to the total amount of the primary raw materials (raw material of a refractory particle and metallic silicon). However, addition exceeding 30% by weight is not preferable inasmuch as it causes an overly high porosity after calcination, resulting in a lack in strength.

Furthermore, when a honeycomb structure with a partition wall thickness of 20 mil (508 $\mu$m) or less is extruded, the molding adjuvant is preferably added in the range of 4 to 20% by weight. The amount of addition being 4% by weight or less makes it difficult to extrude in such a thin wall; conversely, when the amount exceeds 20% by weight, its shape after extrusion is difficult to maintain.

When a honeycomb structure is utilized as a filter, a pore forming agent may be added during preparation of a body for ceramics for the purpose of enhancing the porosity. The amount of pore forming agent to be added is preferably 30% by weight or less as a superaddition to the total amount of the main raw materials (raw material of a refractory particle and metallic silicon). An amount of addition exceeding 30% by weight leads to lack in strength due to the porosity being extremely high.

In addition, even when there is obtained a honeycomb structure with a high porosity of 50% or more, a pore forming agent is preferably added. In this case, an appropriate selection of the kind and average particle diameter of a pore forming agent to be used permits the production of a honeycomb structure of a high porosity, with the pore size distribution controlled. That is to say, while voids among particles of refractory particles, or aggregates, become pores in the present invention, the addition of an appropriate amount of a pore forming agent with a particle diameter being 1.2 to 4 times the average particle diameter of a refractory particle, or an aggregate, can lead to the production of a honeycomb structure of a high porosity having pore size distributions comprising two pore size distributions of voids among particles of refractory particles and burned traces of a pore forming agent. Therefore, an appropriate selection of the particle diameters of refractory particles and a pore forming agent allows flexible material designing with a necessary pore size distribution.

On the other hand, in order to prepare a honeycomb structure of a large pore size, a body for ceramics can be smoothly extruded during extrusion by the addition of an appropriate amount of a pore forming agent having a particle diameter being 0.5 times or less the average particle diameter of a refractory particle even when a refractory particle of a large particle diameter or metallic silicon is employed. Therefore, a honeycomb structure of a high porosity can be produced without lowering moldability.

The kind of a pore forming agent to be used is not particularly limited, and more specifically examples include graphite, wheat flour, starch, phenol resin, polymethyl methacrylate, polyethylene, and polyethylene terephthalate. A pore forming agent may be used in combination of a species, or two species or more, depending on its purpose.

A body for ceramics obtained by admixing and kneading the aforementioned raw material using the usual method is molded in a desired honeycomb shape by means of the extrusion method. Thereafter, the molded body thus obtained is calcined to remove an organic binder (degrease) contained in the molded body and then burned. Calcination is preferably performed at a temperature lower than the temperature at which metallic silicon melts. More specifically, it may be kept temporarily at a specific temperature from about 150 to 700° C., or it may be carried out by rendering the rate of temperature rise to be 50° C./hr or less in a given temperature range.

A method of temporarily keeping the temperature at a given temperature can select the keeping at one temperature or at a plurality of temperatures. In the case of keeping at a plurality of temperatures, the retention times may be the same or different to each other. In addition, a method of decreasing the rate of temperature rise may also select the decreasing only in a given temperature range or in a plurality of temperature ranges. Moreover, for the plurality of ranges, the rates are the same or different to each other.

The atmosphere for calcination may be an oxidation atmosphere, but when organic binders are contained in a molded body in quantity, they sometimes vigorously burn due to oxygen to cause the temperature of the molded body to be rapidly raised. Thus, a method is also preferable that restrains the abnormal temperature rise of the molded body by carrying out calcination under an inert atmosphere of $N_2$, Ar, etc. Suppression of this abnormal temperature rise is an important control when a raw material of a large thermal expansion coefficient (weak in thermal impact) is employed. When organic binders are added, for example, in an amount of 20% by weight or more as a superaddition to the amount of primary raw materials, it is preferable to be calcined under the aforementioned inert atmosphere. In addition, besides the case of a refractory particle being a SiC particle, even when oxidation may occur at a high temperature, it is preferable to restrain the oxidation of a molded body by performing calcination under the aforementioned inert atmosphere at least at a temperature at which oxidation starts or at a temperature higher than the temperature.

Burning subsequent to calcination may be performed in the same furnace or in a separate furnace as a separate step or in the same furnace as a continuous step. When calcination and burning are carried out under different atmospheres, although the former method is also preferable, the latter method is preferable from the viewpoint of the total burning time and the operation cost of the furnace as well.

In order to obtain a structure wherein refractory particles are bonded via metallic silicon, metallic silicon needs to be softened. Because the melting point of metallic silicon is 1410° C., the burning temperature during burning is preferably 1400° C. or higher. A further suitable burning temperature is determined from microstructures and characteristic values. It should be noted that the burning temperature is appropriately from 1400 to 1800° C. in as much as bonding via metallic silicon becomes difficult at temperatures exceeding 1800° C. due to the advance of evaporation of metallic silicon.

In addition, the manufacturing method using the recrystallizing method disclosed in JP-A-6-182228 above can provide a sintered body of a high thermal conductivity because of silicon carbide particles being bonded to each other. However, since sintering is brought by a mechanism of evaporation/condensation as discussed above, in order to evaporate the silicon carbide, a firing temperature higher than that of the manufacturing method of the present invention is required, and a high temperature of at least 1800° C., normally 2000° C. or higher is required to obtain a practically usable silicon carbide burned body.

The atmosphere of firing is preferably selected according to the kind of a refractory particle. For example, particles of carbides including SiC, particles of nitrides representatively including $Si_3N_4$ and AlN, which may be oxidized at elevated temperatures, are preferably placed at non-oxidizing atmospheres such as $N_2$ and Ar at least in the temperature range of a temperature at which oxidation starts or higher.

Hereinafter, the present invention will be discussed in more detail by means of examples, but the present invention is by no means limited to these examples.

EXAMPLES 1 to 13, COMPARATIVE EXAMPLES 1 to 2

Figure 1:
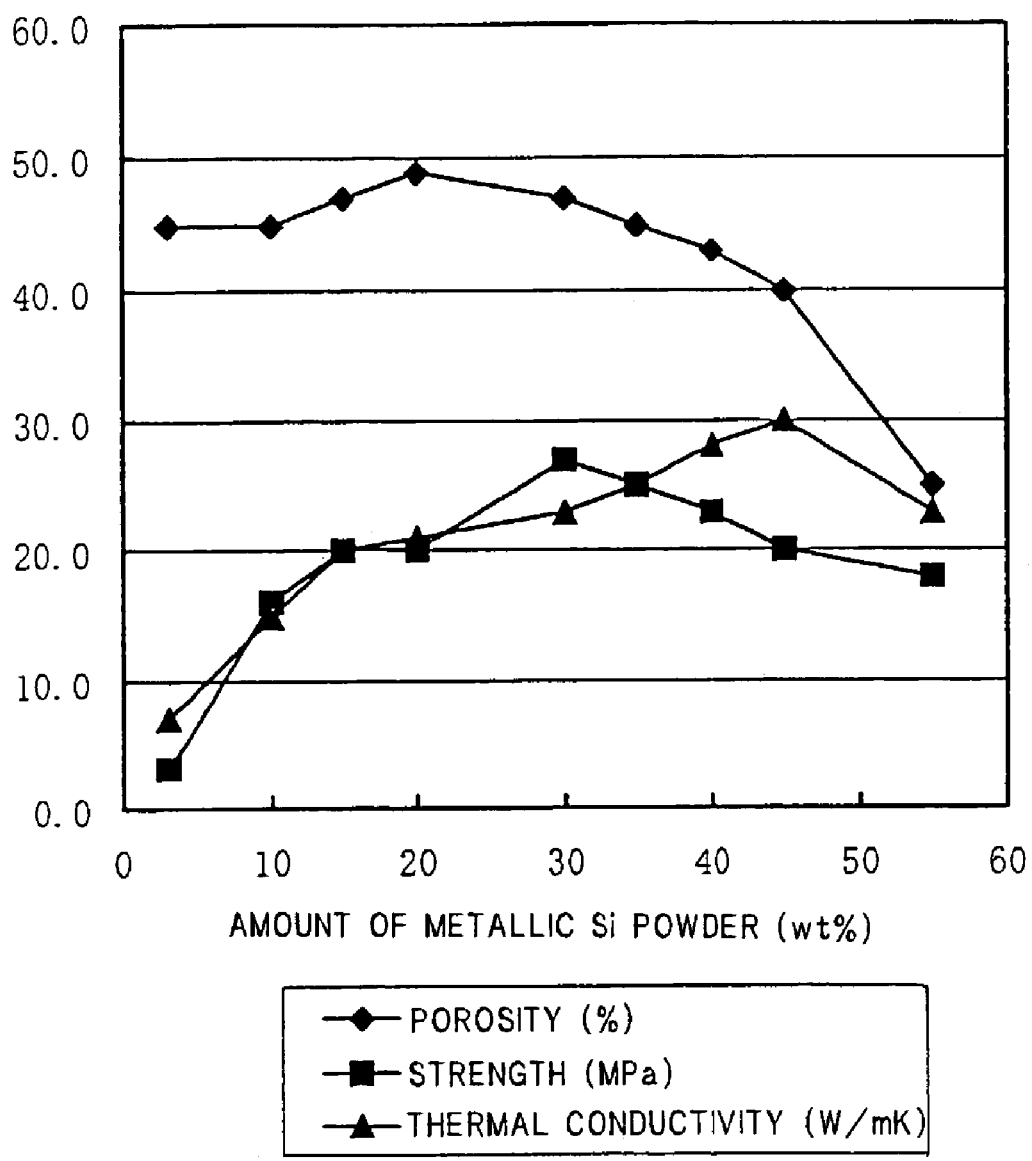
FIG. 1 is a graph of plotting the porosity (%), strength (MPa) and thermal conductivity (W/mK) versus the amount of metallic Si powder formulated.

A SiC raw material powder having an average particle diameter and a metallic Si powder with an average particle diameter of 4 μm, as shown in Table 1, are formulated on the basis of the compositions indicated in the table, and to 100 parts by weight of this resulting powder, 6 parts by weight of methylcellulose as an organic binder, 2.5 parts by weight of a surfactant and 24 parts by weight of water were added and then uniformly admixed and kneaded to give a body for ceramics for molding. The body for ceramics thus obtained was formed by means of an extruder into a honeycomb shape having an outer diameter of 45 mm, a length of 120 mm, a partition wall thickness of 0.43 mm and a cell density of 100 cells/square inch (16 cells/cm²). This honeycomb molded body was calcined at 550° C. for 3 hours for degreasing, and then was burned for 2 hours under a non-oxidation atmosphere at a burning temperature indicated in Table 1 to prepare a silicon carbide burned body of a porous honeycomb structure. This burned body was subjected to measurements of the average pore diameter and the porosity using a mercury porosimeter, the thermal conductivity with a laser flash method, and further the 4-point bending strength. The results are listed in Table 1. In addition, FIG. 2 shows a microscopic photo of the crystal structure of the silicon carbide sintered body prepared in Example 1. Furthermore, FIG. 1 illustrates a graph plotting the porosity (%), strength (MPa) and thermal conductivity against the amount of metallic Si powder formulated (wt %). Additionally, X-ray diffraction determined the crystalline phase and confirmed that it consists of SiC and Si.

TABLE 1

|  | Average particle diameter of SiC powders (μm) | Amount of SiC powders formulated (wt %) | Average particle diameter of metallic Si powders (μm) | Amount of metallic Si powders formulated (wt %) | Burning temperature (° C.) | Average pore diameter (μm) | Porosity (%) | 4-Point bending strength (Mpa) | Thermal conductivity (W/mk) |
|---|---|---|---|---|---|---|---|---|---|
| Example 1 | 32.6 | 80 | 4 | 20 | 1450 | 9.0 | 49.0 | 20 | 21 |
| Example 2 | 32.6 | 80 | 4 | 20 | 1600 | 10.0 | 44.0 | 25 | 20 |
| Example 3 | 32.6 | 65 | 4 | 35 | 1450 | 12.0 | 45.0 | 25 | 25 |
| Example 4 | 32.6 | 65 | 4 | 35 | 1600 | 13.0 | 42.0 | 28 | 26 |
| Example 5 | 50.0 | 80 | 4 | 20 | 1450 | 11.6 | 45.0 | 20 | 21 |
| Example 6 | 50.0 | 80 | 4 | 20 | 1600 | 13.5 | 49.0 | 22 | 20 |
| Example 7 | 32.6 | 90 | 4 | 10 | 1450 | 9.0 | 45.0 | 16 | 15 |
| Example 8 | 32.6 | 85 | 4 | 15 | 1450 | 9.0 | 47.0 | 20 | 20 |
| Example 9 | 32.6 | 80 | 12 | 20 | 1450 | 11.0 | 43.0 | 20 | 20 |
| Example 10 | 32.6 | 80 | 30 | 20 | 1450 | 13.0 | 42.0 | 18 | 25 |
| Example 11 | 32.6 | 70 | 4 | 30 | 1450 | 12.0 | 47.0 | 27 | 23 |
| Example 12 | 32.6 | 60 | 4 | 40 | 1450 | 12.0 | 43.0 | 23 | 28 |
| Example 13 | 32.6 | 55 | 4 | 45 | 1450 | 14.0 | 40.0 | 20 | 30 |
| Comparative Example 1 | 32.6 | 97 | 4 | 3 | 1450 | 8.0 | 45.0 | 3 | 3 |
| Comparative Example 2 | 32.6 | 45 | 4 | 55 | 1450 | 16.0 | 25.0 | 18 | 23 |

(Discussions)

There were found decreases in strength and thermal conductivity in Comparative Example 1 and a decrease in porosity in Comparative Example 2. On the other hand, Examples 1 to 13 concerning the present invention indicate, for examples, sufficient numerical values for the porosity, strength and thermal conductivity required when the structure is used, for example, as a DPF for collecting and removing particulates contained in exhaust gas discharged from a diesel engine. Also, the graph illustrated in FIG. 1 shows that an appropriate amount of metallic Si powder to be added lies within the range of 5 to 50% by weight with respect to the total amount of the SiC raw material powder and the metallic Si powder. These results have confirmed an excellent effect of the present invention.

EXAMPLES 14 to 20

A SiC raw material powder and a metallic Si powder with an average particle diameter, as shown in Table 2, are formulated on the basis of the compositions indicated in the table, and further to 100 parts by weight of this resulting powder, the amount (parts by weight) indicated in the table of polymethyl methacrylate as a pore forming agent, 8 parts by weight of methylcellulose as an organic binder, 2.5 parts by weight of a surfactant, and 28 parts by weight of water were added, and then a honeycomb structure of a silicon carbide sintered body was prepared by a similar method as in Examples 1 to 13. In addition, a firing temperature of 1450° C. was used for every case. This sintered body was measured for the average pore diameter and the porosity using a mercury porosimeter and for the thermal conductivity with a laser flash method.

TABLE 2

|  | Average particle diameter of SiC powders (μm) | Amount of SiC powders formulated (wt %) | Average particle diameter of metallic Si powders (μm) | Amount of metallic Si powders formulated (wt %) | Average particle diameter of pore-forming agent (μm) | Amount of pore-forming agent formulated (%) | Porosity (%) | Average pore diameter (μm) | Thermal conductivity (W/mk) |
|---|---|---|---|---|---|---|---|---|---|
| Example 14 | 32.6 | 80 | 4 | 20 | 60 | 20 | 58.0 | 21.0 | 14 |
| Example 15 | 32.6 | 75 | 4 | 25 | 12 | 14 | 53.0 | 13.0 | 25 |
| Example 16 | 47.0 | 85 | 12 | 15 | 12 | 20 | 60.0 | 18.0 | 12 |
| Example 17 | 47.0 | 80 | 12 | 20 | 12 | 20 | 58.0 | 15.0 | 16 |
| Example 18 | 68.0 | 85 | 12 | 15 | 30 | 20 | 55.0 | 30.0 | 18 |
| Example 19 | 68.0 | 90 | 12 | 10 | 60 | 25 | 66.0 | 40.0 | 10 |
| Example 20 | 32.6 | 80 | 4 | 20 | 60 | 30 | 70.0 | 25.0 | 9 |

(Discussion)

Table 2 shows that a honeycomb structure of the present invention, for example, indicates sufficient numerical values of the porosity, thermal conductivity and average pore diameter required when the structure is used as a filter having a catalyst carried or the like for purifying automobile exhaust gas. In addition, even when the particle diameter of a SiC powder, or an aggregate, is made large (Examples 16 to 19), a honeycomb structure was successfully produced without molding defects by adjusting the particle diameter and formulation amount of a pore forming agent. This has confirmed the excellent effect of the present invention.

INDUSTRIAL APPLICABILITY

As discussed above, a honeycomb structure of the present invention, while containing refractory particles such as a silicon carbide particle, can be sintered at comparatively low burning temperature during the production thereof. Therefore, the production cost can be suppressed and the yield can be improved, that is, the product can be provided at a low price. In addition, the structure has a high thermal conductivity relative to a conventional structure wherein refractory particles are bonded through the use of glass material, and so, even when it is, for example, used for a DPF, or even if an accumulated particulate is combusted for filter reproduction, a local heat evolution that damages the filter does not occur. Moreover, the structure has a porosity and a thermal conductivity in specified numerical ranges, and is-a porous honeycomb structure with a low pressure loss, and therefore can be suitably used as a filter having a catalyst supported or the like for purifying automobile exhaust gas even under high SV conditions.

The invention claimed is:

1. A honeycomb structure having a large number of channels through along the axial direction and defined by partition walls, wherein the structure is porous and includes refractory particles and metallic silicon, wherein the refractory particles are bonded via said metallic silicon in part of the refractory particle surface as a non-continuous coating, thereby forming an aggregate.

2. The honeycomb structure according to claim 1, wherein the structure has a thermal conductivity of 5 W/mK or more.

3. The honeycomb structure according to claim 1, wherein said refractory particles keeping the raw material particle shape are bonded via said metallic silicon.

4. The honeycomb structure according to claim 1, wherein said refractory particle is a silicon carbide particle.

5. The honeycomb structure according to claim 1, wherein the structure is used as a filter for collecting and removing granular materials contained in a dust-bearing fluid.

6. The honeycomb structure according to claim 1, wherein the porosity is within the range of 30 to 90%.

7. The honeycomb structure according to claim 1, wherein the average pore diameter is within the range of 2 to 50 μm.

8. The honeycomb structure according to claim 1, wherein the porosity is within the range of 50 to 90% and the thermal conductivity is within the range of 5 to 30 W/mK.

9. The honeycomb structure according to claim 1, wherein the content of said metallic silicon is within the range of 5 to 50% by weight with respect to the total amount of the raw material of said refractory particle and the metallic silicon.

10. The honeycomb structure according to claim 1, wherein said partition wall thickness is from 102 to 1270 μm.

11. The honeycomb structure according to claim 1, wherein said partition wall thickness and the porosity of a honeycomb structure satisfy the relation:

partition wall thickness (μm)≧porosity (%)×4.

12. The honeycomb structure according to claim 1, wherein said partition wall thickness and the porosity of a honeycomb structure satisfy the relation:

partition wall thickness (μm)≧porosity (%)×5.

13. The honeycomb structure according to claim 1, wherein said partition wall thickness and the porosity of a honeycomb structure satisfy the relation:

partition wall thickness (vm)≧porosity (%)×20.

14. The honeycomb structure according to claim 1, wherein the cell density is 0.7 to 155 cells/cm$^2$.

15. The honeycomb structure according to claim 1, wherein the metallic silicon has an average particle diameter that is 50% or less of an average diameter of the refractory particle.

16. A method for manufacturing a honeycomb structure having a large number of channels through along the axial direction and defined by partition walls, and the structure is porous and includes refractory particles and metallic silicon that form an aggregate by bonding of the refractory particles via the metallic silicon in part of the refractory particle surface as a non-continuous coating, wherein the method involves adding metallic silicon in such a sufficient amount that the metallic silicon remains in a required amount even after burning and an organic binder to the raw material of refractory particles, mixing and kneading it, forming the resulting body for ceramics into a honeycomb shape, calcining the obtained molded body to remove the organic binder in the molded body, and subsequently burning.

17. The manufacturing method according to claim 16, wherein the raw material of said refractory particle is the raw material of a silicon carbide particle.

18. The manufacturing method according to claim 16, wherein the average particle diameter of the raw material of said refractory particle is 2 to 4 times the average pore diameter of a honeycomb structure finally obtained.

19. The manufacturing method according to claim 16, wherein the amount of said metallic silicon to be added is within the range of 5 to 50% by weight with respect to the total amount of the raw material of said refractory particle and the metallic silicon.

20. The manufacturing method according to claim 16, wherein the average particle diameter of said metallic silicon is 50% or less of the average particle diameter of a refractory particle, or an aggregate.

21. The manufacturing method according to claim 16, wherein said organic binder is added within the range of 2 to 30% by weight as a superaddition to the total amount of the raw material of said refractory particle and the metallic silicon.

22. The manufacturing method according to claim 16, wherein upon preparing said body for ceramics, a pore forming agent is added in the range of 30% by weight as a super addition to the total amount of the raw material of said refractory particle and the metallic silicon.

23. The manufacturing method according to claim 16, wherein said calcination of a molded body is carried out at a temperature lower than the temperature at which said metallic silicon melts.

24. The manufacturing method according to claim 16, wherein said burning is performed within the temperature range of 1400 to 1800° C.

* * * * *